Oct. 14, 1941.  E. A. RING  2,259,080
NOSE PAD OR GUARD FOR EYEGLASSES, SPECTACLES, AND THE LIKE
Filed Feb. 7, 1940
*Fig. 1.*
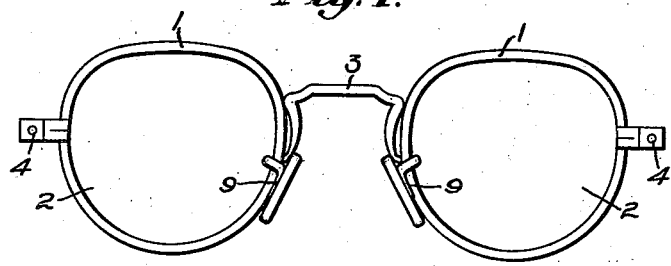
*Fig. 2.* 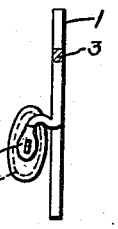 *Fig. 3.* 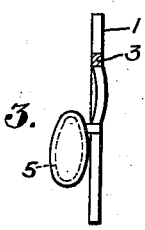
*Fig. 4.* 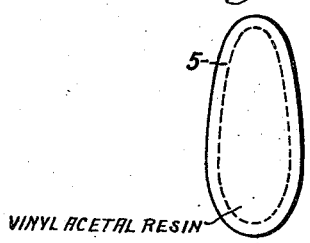 *Fig. 5.* 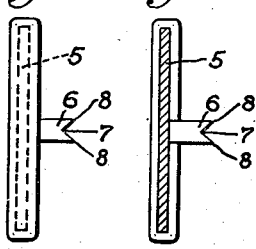 *Fig. 6.* *Fig. 7.* 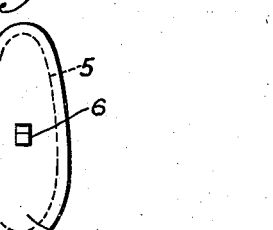
*Fig. 8.* 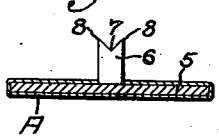 *Fig. 9.* 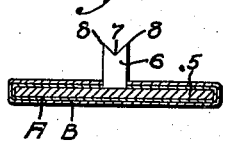 *Fig. 10.* 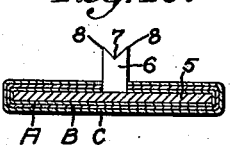

Inventor:
Ernest A. Ring,
by Emery, Booth, Townsend, Miller and Neidner
Attys.

Patented Oct. 14, 1941

2,259,080

UNITED STATES PATENT OFFICE 2,259,080

NOSE PAD OR GUARD FOR EYEGLASSES, SPECTACLES, AND THE LIKE

Ernest A. Ring, Providence, R. I., assignor of one-half to Francis M. Blakeney, East Providence, R. I.

Application February 7, 1940, Serial No. 317,709

5 Claims. (Cl. 88—48)

This invention relates to nose pads or guards for eyeglasses, spectacles and the like.

In order that the principle of the invention may be readily understood, I have in the accompanying drawing disclosed a single embodiment of the structure of my invention, and have disclosed how the laminated covering is applied to the basal element of the nose pad or guard.

In the said drawing:

Fig. 1 is a rear elevation of a pair of eyeglasses or spectacles constructed in accordance with my invention or having my invention applied thereto;

Figs. 2 and 3 are respectively rear and front elevations of the nose pad or guard and an adjacent portion of the frame from which it is supported;

Fig. 4 is an enlarged view of the nose pad or guard, viewing the same from the surface thereof that contacts with the nose, and representing the use of a plastic composition here briefly and generally referred to as a resinous product resulting from the polymerization of certain vinyl compounds;

Fig. 5 is an edge elevation of the structure shown in Fig. 4;

Fig. 6 is a vertical section thereof;

Fig. 7 is a rear or opposite elevation of the structure shown in Fig. 4;

Figs. 8, 9 and 10 are vertical transverse sections representing steps in the manufacture of the nose pad or guard according to one process practised by me;

Figure 11:
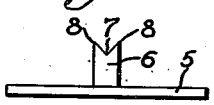
Fig. 11 is an edge view of the metal basal member about which, in accordance with my invention, the plastic substance is suitably positioned.

This application is a continuation as to common subject-matter of my pending application, Ser. No. 190,369, filed February 14, 1938, for Nose pads for eyeglasses and spectacles, now Patent No. 2,216,503, October 1, 1940.

It has long been sought to provide suitable nose pads or guards for spectacles, eyeglasses and the like, but so far as I am aware no entirely satisfactory substance has heretofore been found or used for this purpose. The prior art discloses the use of many different substances such as metal, shell or bone, and such substances in many cases have been covered with some material, such as soft rubber. The contact of rubber directly with the skin of the wearer has long been known to be objectionable, and various other materials have been tried, either to overlay the rubber and thus to prevent direct contact thereof with the nose of the wearer, or as substitutes for the metal, shell, bone or other substance constituting the basal member of the nose pad or guard.

There has been a long standing problem in eyeglass wear, the proper solution of which has never heretofore been arrived at so far as I am aware. The problem in question includes that of resting or supporting a pair of eyeglasses on the sides of the nose in such manner and with the use of such material as to allow the wearer maximum comfort and efficiency, and yet at the same time preventing the direct contact with the skin of the wearer of any substance that may injuriously affect the skin.

Not only has it been established that the direct contact with the skin of the wearer of rubber in any form as a nose pad or guard is deleterious, but nose pads or guards employing rubber as the surface to come in direct contact with the skin of the wearer are comparatively expensive over a period of time.

Where rubber has been so used, it has been customary from time to time to remove the rubber material and to substitute a fresh rubber piece therefor. This, however, involves a substantial expense if the user wishes to secure efficiency in use and the best appearance of the device.

Moreover, with such substances as have heretofore been employed as the skin-contacting substance, the nose pad or guard soon becomes dirty on the outer surface, and this increases the hazard of infection. Physicians are practically agreed that continued direct contact with rubber is unhealthy for tender skin. Moreover, a period of wear of such a device having a skin-contacting rubber surface for a few months, results in the rubber portion of the pad or guard becoming swollen. In many instances the rubber member completely disintegrates before the supposed time limit of wear is reached. Furthermore, many such articles are unsightly from the very commencement of this use, and they continue to become more and more unsightly the longer they are used.

Owing to the objections in one way or another to all substances heretofore used or the use of which I have experimented with and tested, I have conducted painstaking investigations to obtain a wholly satisfactory substance, with the result that with a certain material hereinafter more definitely described, I have developed or discovered unexpected qualities or capacities of the material and have found that by using such material in accordance with the herein described steps of my process, I have provided a nose pad or guard which constitutes its own cushion and does not need an underlying cushioning material of rubber or anything else. In other words, the material is self-cushioning. The material also responds to the body heat or temperature of the skin of the wearer in that it adapts itself to the shape of the part of the nose with which it comes in contact. I have also discovered that the action of the oils or exudations of the skin of the wearer of the eyeglasses or spectacles, makes the material more pliable and removes a certain stickiness natural to the substance employed, and which stickiness, when removed in the manner stated, does not return to the substance.

The foregoing and other qualities which I have ascertained as unexpected advantages and unexpected features of adaptability of the substance, render the same what I believe to be a nose pad or guard, or skin-contacting portion thereof, for which I and other manufacturers of eyeglasses and spectacles have long sought, and heretofore in vain.

The substance found to be wholly satisfactory as employed by me may be briefly described as a resinous product resulting from the polymerization of certain vinyl compounds. More precisely stated, I employ a plastic composition obtainable by polymerizing compounds containing the vinyl ($CH_2:CH$) or substituted vinyl radicals and defined generally as polyvinyl resins; for example, polyvinyl halides, a copolymer obtained from vinyl acetate and vinyl chloride, the polyvinyl esters, and vinylidene halide polymers, the polyvinyl acetals, the polyacrylates, polymethacrylates, and copolymers of vinyl chloride and acrylates, and polystyrene.

I have obtained the best results in the manufacture of nose pads or nose guards with polyvinyl acetal resins. These vary in the proportion of the degree of hydrolysis of the ester and the degree of combination of the aldehyde. I obtain a very highly satisfactory polyvinyl acetal resin by hydrolyzing a polyvinyl acetate and reacting with formaldehyde so that the final resin is made substantially of 82% acetal, 8% hydroxyl groups, calculated as polyvinyl alcohol, and 10% acetate by weight. Another very highly satisfactory plastic compound of a polyvinyl resinous nature is produced by hydrolyzing a polyvinyl acetate and reacting with butyraldehyde, so that the final resinous substance may be considered to be made of substantially 2% or less of acetate, 16 to 20% hydroxyl groups calculated as polyvinyl alcohol and the balance acetal. Both of the foregoing substances I suitably plastercize, in order to adapt them to my purpose, as will be set forth hereinafter.

I may also employ polyvinyl acetals made with other aldehydes, as, for example, acetaldehyde propionaldehyde, valeraldehyde and the like, or mixtures of aldehydes may be used. More briefly stated, I employ a vinyl resin and more specifically the vinyl acetals of the so-called "Butvar" type.

A vinyl resin of the Butvar type may be briefly defined as a partial polyvinyl acetal employing butyraldehyde as the acetalization medium. Other polyvinyl acetals may vary in the extent of hydroxyl groups, the residual ester groups and the acetal groups present in the vinyl composition.

As herein fully set forth, the polyvinyl acetal resinous coating material employed by me and which is directly applied as a self-cushioning plastic material to the basal element, is, because of its herein defined composition, inherently responsive to the body heat at the place of use and is strongly resistant to any deterioration therefrom, and it inherently adapts itself to and retains the shape of the nose at the area of the place of use thereof, and because of its defined composition it is non-sticky in use. Other advantages thereof are herein set forth.

Having referred in detail to certain plastic substances which I have found to possess unexpected qualities peculiarly adapting them to use as a nose guard or pad that comes in direct contact with the skin, I shall proceed to describe the preferred embodiment of my invention without, however, limiting my invention to the things herein described.

In Fig. 1, I have represented a pair of eyeglasses or spectacles, the frame whereof is shown at 1, and the glass elements at 2. The nose piece is indicated at 3. These parts may be of any usual or preferred construction. The nose piece 3 is formed with or suitably attached to the frame 1, and suitable temples may be attached, in the case of spectacles, at the parts 4. The nose piece 3 is provided with two guards or pad portions to engage the opposite sides of the nose of the wearer.

While the basal portion of such pads or guards may be constructed in any suitable manner, I preferably provide a basal member 5 of suitable shape, which is of metal. It may be of nickel, silver, gold, platinum, white gold, or almost any semi-precious or precious metal. It has preferably formed integral therewith a rivet-like protruding part or post 6. Said rivet-like part or post 6 is desirably slitted as indicated at 7 to provide two supports or prongs 8. The somewhat enlarged part 9 of the guard, as shown in Fig. 2, is provided with a hole through which the rivet-like part or post 6 passes, after which the prongs 8 are bent or forced outwardly so as to lie flatwise against the surface of the part 9, thereby firmly securing the basal member 5 of the nose guard or nose pad to the frame. In this or any other suitable manner, the basal portion of the nose pad or guard is attached. It is immaterial, so far as my invention is concerned, how the basal member 5 is attached to the frame 1.

In order to prepare or construct the nose guard or pad, I preferably provide two receptacles in one of which I place the hereinbefore described material, which I shall here briefly refer to as vinyl acetal resin, in two sheets, one superimposed upon the other, and in the other of which receptacles I place three sheets thereof superimposed in the same manner. I then soak the said resinous material in the two receptacles in a suitable solvent, which is not one containing alcohol, as upon tests made by me an alcohol solvent has been found unsatisfactory for my purpose. The solvent employed by me softens the resinous material sufficiently to make a bond, but it must be and is of such a character as not to deteriorate the resinous material which is, in carrying out my invention, thoroughly soaked in the solvent. I need not employ two receptacles, one containing two laminations and the other three or other number of laminations of the resinous material, but may instead successively dip the basal member 5 into the resinous material when in a plastic condition, so as to apply first a single layer A thereto, as shown in Fig. 8, then a second layer B to that, as shown in Fig. 9, and then a third layer C, as shown in Fig. 10, all bonded together.

I will, however, refer in detail to the procedure of utilizing two layers or laminations of the resinous material placed in one receptacle and three layers or laminations thereof placed in another receptacle, without limiting myself thereto.

The resinous material is in suitable size for the purpose of making nose guards, and I may prepare each small piece of the resinous material of about the right size for a nose guard, by placing a hole in said piece of material, said hole being slightly smaller than the diameter of the post 6 of the metal base 5. Or, I may, while the said resinous material is in sheets of relatively large size in two superimposed laminations, as stated, place a series of holes therein at suitable distances apart, each slightly smaller than the diameter of the post 6, so as to receive the posts 6 of the various basal members 5. Then the posts or parts 6 of the said basal members are respectively inserted in said openings in the sheet consisting of the two laminations.

It is to be understood that the solvent employed has rendered the said resinous material satisfactorily plastic and that the two laminations become or will become bonded together. Each basal member 5 with the said two bonded laminations of the resinous material is then placed in the other receptacle containing the three or other number of sheets or laminations. Then the structure having the five sheets or laminations, or, if desired, the three laminations, as shown in Fig. 10, or other suitable number, is placed in a press where a suitable pressure is applied, previous to which, however, additional solvent is applied by atomization to the laminated resinous material. The said resinous material is then removed from the press, and the resulting rough pads are die-cut out by placing the post end 6 thereof in a rectangular holding slot, the cutting die being guided in the exact cutting position which is most preferable. The several pads in their described condition are then inserted into small post holders and are twirled against a suitable sand belt or the like in such manner as to remove the rough edges from the pads.

Each pad, in its just described stage of manufacture, is then transferred to a rubbing wheel so as to impart the desired smoothness. Preferably the nose pad or guard is then dipped into a solvent such as Monsanto No. 45 dip, which is a mixture of one or more ketones and one or more esters, thereby obtaining a very clear, brilliant finish and transparency.

Desirably before applying the basal member 5 to the said resinous material, I treat the said metal member 5 with a suitable liquid material to remove finger prints and to aid in the binding of the resinous material to the said metal or basal member 5. Such liquid material may also be what is known as Monsanto No. 45 dip, above identified.

Figure 12:
Fig. 12 represents the preferred shape of the completed nose pad or guard prior to its attachment to the eyeglasses or spectacles.

In Fig. 11, I have represented the basal member 5 with its post or part 6 before the resinous material has been applied thereto in any suitable manner. Preferably after said material has been applied in any suitable manner, I then, by the use of suitable tools, slightly concave the said member 5 with its resinous coating, as shown in Fig. 12.

I am, of course, aware theat vinyl resins have been employed in certain wholly unrelated processes, but I believe I am the first to employ such material in such way, or to adapt it to such use that the said resinous material contacts in use with the skin when the article to which it is applied is in its intended use. Being the first, so far as I am aware, to make such use thereof, I have in making said use ascertained that the resinous material has unexpected qualities adapting it to the said use as a skin-contacting substance. Among the said unexpected qualities which I have discovered or developed are: (1) the substance is self-cushioning and does not need any cushioning member thereunder, such as rubber, (2) the said resinous material, desirably a vinyl acetal resin, by reason of coming into contact with the skin of the user of the eyeglasses or spectacles, is in such case rendered more pliable, and thus in use actually comes to conform to the shape or contour of the nose at the area of contact of the pads with the nose, and (3) the oils or exudations of the skin are found to remove permanently the stickiness present in the resinous material.

I have discovered that not only does the solvent employed by me render the resinous material, or resinous material composition, suitably plastic so that it makes a bond of the several laminations of the resinous material, but that in its said plastic condition it suitably adheres to the metal basal member, particularly when the same has been given a suitable liquid dip to aid in the binding of the resinous material thereto, and even more important, the solvent, in the presence of heat and pressure, thoroughly clears up the resinous material and makes it transparent.

I have discovered that the said resinous material is, in the herein described stages of manufacturing the nose pad or guard, readily absorbent, so that it will retain color dyes that I apply thereto. Therefore, I may and do dye the nose pad or guard any desired color, or I may change the color which it may have had as the result of the steps of its manufacturer into vinyl acetate resin.

Many of the substances hereto used for the skin-contacting portion of nose pads or nose guards are brittle or became so in use, but I have discovered that this is not the case with the material employed by me, and here referred to briefly as vinyl acetate resin. The said material has been proved by me to have the quality of permanence as a nose pad or guard, although it is soft and pliable and is self-cushioning, a most highly desirable quality.

It is to be understood that the resinous materials employed by me vary, depending among other things upon the polyvinyl ester used, the extent of the hydrolysis reaction and the nature and amount of the aldehyde combined.

Vinyl resins suitable for use in my invention may be formed from vinyl esters by known polymerization processes, and the substance employed by me is a vinyl resin or vinyl resin composition.

If I resort to the procedure of making a hole in a small piece of the herein described laminations of resinous material, or of making a series of holes at suitably spaced intervals in a larger sheet, for the reception of the posts 6, I may do this not only with the two laminations in the first receptacle, but also in the three or other number of laminations in the second receptacle.

Having thus described certain embodiments of the structure of my invention and explained the manner of applying the covering of polyvinyl acetal resin, it is to be understood that although specific terms are employed, they are used in a generic and descriptive sense and not for purposes of limitation, the scope of the invention being set forth in the following claims.

I claim:

1. In eyeglasses, spectacles and like optical articles having a frame including a nose piece, a nose pad or guard having a basal element secured to the nose piece, and having a skin-contacting-in-use, tightly applied, laminated covering of polyvinyl acetal resin constituting a self-cushioning, plastic material that is very markedly self-cushioning in comparison with commercial zylonite and Celluloid, and, because of its said composition, being devoid of the generally recognized objections to rubber as a skin-contacting substance, said applied plastic material being tightly and permanently adherent to the said basal element and being, because of its said composition, inherently responsive to the body heat at the place of skin-contact in use, so as in use substantially to self-mold or self-cushion itself to the nose contour or nose formation of the wearer, said applied covering being strongly resistant against deterioration emanating from contact with the skin in the use of the said eyeglasses, spectacles and the like.

2. In eyeglasses, spectacles and like optical articles having a frame including a nose piece, a nose pad or guard having a basal element secured to said nose piece, and having a laminated covering of polyvinyl acetal resin very markedly self-cushioning in comparison with commercial zylonite and Celluloid and, because of its said composition, being devoid of the generally recognized objections to rubber as a skin-contacting substance, said covering being tightly and permanently adherent to the said basal element and itself consisting of a series of very thin laminations of polyvinyl acetal resin very tightly compressed and compacted in position onto said basal element, the said covering, because of its said composition, being inherently responsive to the body heat of the area of skin-contact with the nose of the wearer, so as substantially to self-mold or self-cushion itself to the nose contour or formation of the wearer, and also being strongly resistant to deterioration from such contact with the skin of the wearer, and being non-sticky in use.

3. A nose guard or pad for eyeglasses, spectacles and like optical articles according to claim 2, but in which the laminated covering of polyvinyl acetal resin is obtained by hydrolyzing the polyvinyl acetate and reacting with formaldehyde.

4. A nose pad or guard for eyeglasses, spectacles and like optical articles according to claim 2, but in which the laminated covering of polyvinyl acetal resin is composed substantially of 82% acetal, 8% hydroxyl groups calculated as polyvinyl alcohol, and 10% acetate by weight.

5. A nose pad or guard for eyeglasses, spectacles and like optical articles according to claim 2, but in which the laminated covering of polyvinyl acetal resin is a partial polyvinyl acetal employing butyraldehyde as the acetalization medium.

ERNEST A. RING.